United States Patent [19]
Robinson

[11] Patent Number: 4,751,792
[45] Date of Patent: * Jun. 21, 1988

[54] BRACKETS FOR A FRAME FOR A GARDEN BED

[75] Inventor: Edward N. Robinson, Shelburne, Vt.

[73] Assignee: Danform Agencies, Inc., Shelburne, Vt.

[*] Notice: The portion of the term of this patent subsequent to Mar. 24, 2004 has been disclaimed.

[21] Appl. No.: 6,242

[22] Filed: Jan. 20, 1987

Related U.S. Application Data

[63] Continuation-in-part of Ser. No. 762,060, Aug. 2, 1985, Pat. No. 4,651,466.

[51] Int. Cl.$^4$ .............................................. A01G 9/00
[52] U.S. Cl. ....................................................... 47/19
[58] Field of Search ................ 47/26, 67, 19; 248/208

[56] References Cited

U.S. PATENT DOCUMENTS 4,651,466  3/1987  Robinson ................................. 47/26

FOREIGN PATENT DOCUMENTS 633808  2/1928  France ..................................... 47/19

Primary Examiner—Robert A. Hafer
Assistant Examiner—Bradley M. Lewis
Attorney, Agent, or Firm—Berman, Aisenberg & Platt

[57] ABSTRACT

Brackets for engaging frame members of a raised garden bed have a plurality of sockets, for example, a larger socket and a smaller socket, for engaging one end of alternative supports of different diameters. The brackets are made of substantially rigid material and the alternative supports are adapted to alternative coverings of different materials for extending the growing season of plants planted within the frame of the garden bed. Brackets may either be simple straight brackets for fastening on the outside of a straight member of the frame, corner brackets having an L-shaped angle at one end, or J-shaped brackets for engaging over the top of a frame member.

6 Claims, 2 Drawing Sheets

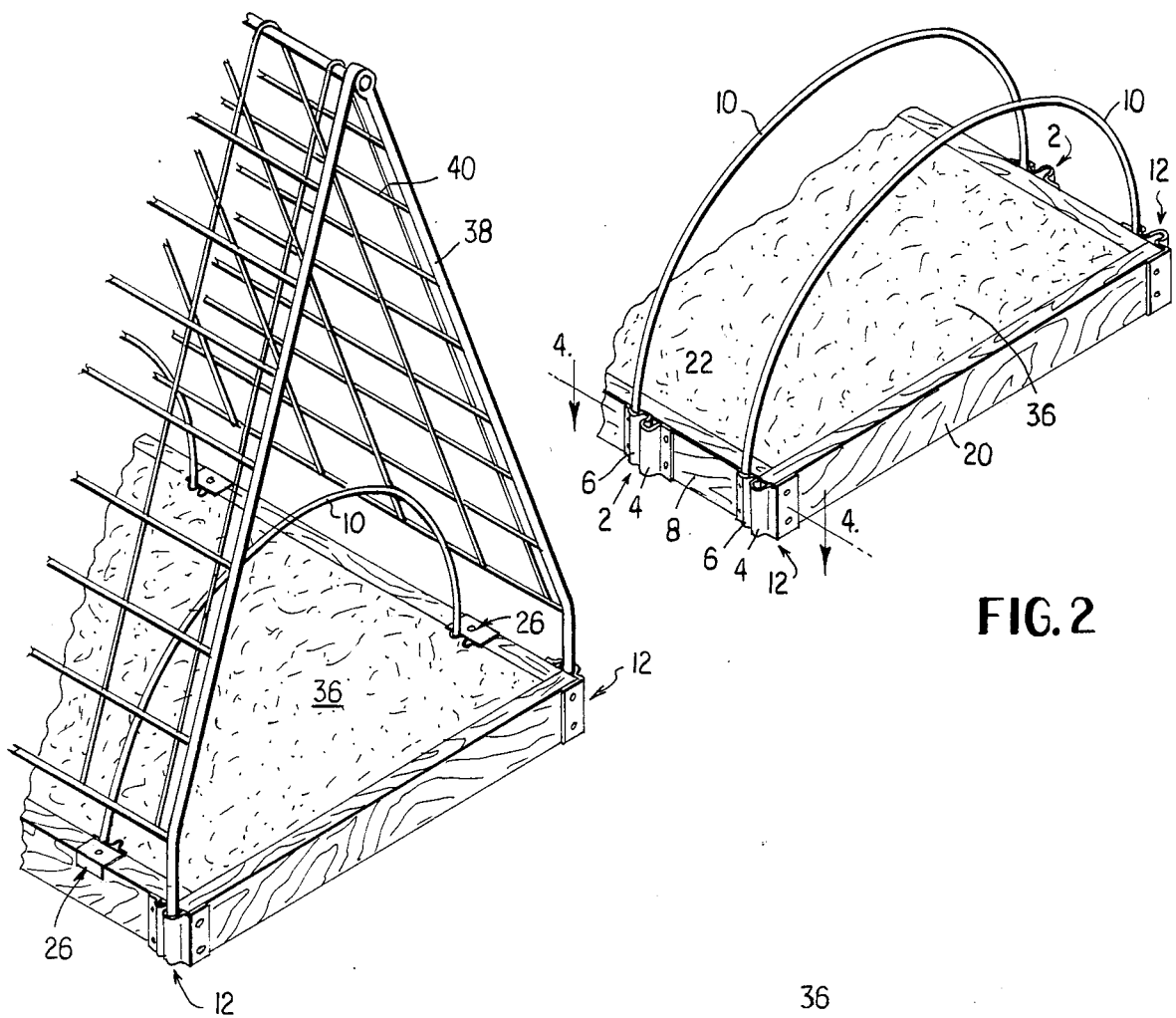
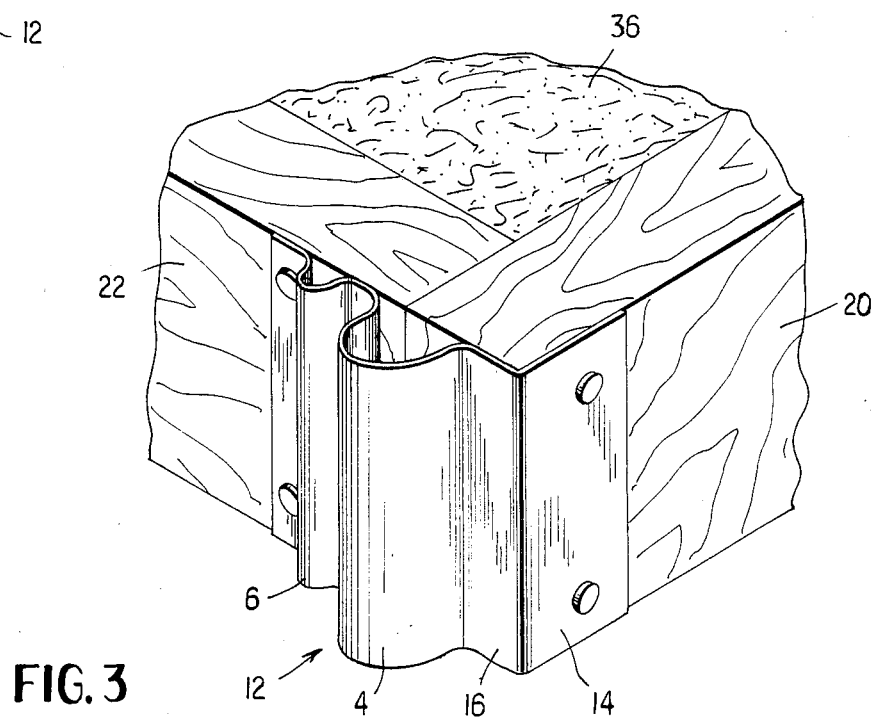
FIG. 1
FIG. 2
FIG. 3

BRACKETS FOR A FRAME FOR A GARDEN BED

RELATED APPLICATIONS

This application is a continuation-in-part of Ser. No. 762,060, filed Aug. 2, 1985, now U.S. Pat. No. 4,651,466.

FIELD OF THE INVENTION

The invention relates to raised garden beds and apparatus therefor.

BACKGROUND OF THE INVENTION

Raised garden beds are well known in the art, particularly for facilitating cultivation on low lying ground by raising the surface level and improving drainage. Raised garden beds are particularly advantageous for improving the quality of the soil, and for increasing the length of the growing season.

SUMMARY OF THE INVENTION

Brackets having a plurality of sockets of different sizes for use with a frame for a raised garden bed are attached along sides of the frame, around corners of the frame, or engaged over the top edge of the frame. An end of a support is engaged in a socket of corresponding size in the bracket which may be attached to either the inner perimeter or the outer perimeter of the frame member.

It is an object of the invention to provide improved brackets for engagement on the frame of a raised garden bed.

BRIEF DESCRIPTION OF THE DRAWINGS

FIG. 1 is a perspective view of a portion of a raised bed showing use of corner brackets and J-brackets of the invention.

FIG. 2 shows a raised bed of FIG. 1 having hoop supports engaging corner brackets and straight brackets of the invention.

FIG. 3 is a corner detail of FIG. 2.

DETAILED DESCRIPTION OF THE INVENTION

The specification of patent application Ser. No. 762,060, filed Aug. 2, 1985, is incorporated herein by reference.

A raised garden bed can be used with different coverings to extend the growing season of plants in the garden bed. An appropriate covering, such as clear plastic will protect the bed from frost while allowing sufficient light for plant growth. Seeds may be planted in the bed early in the spring before danger of frost has passed, and the growing season can be extended well into the frosty days of fall. During the summer months when frost protection is not needed, the supports for the garden bed may be used for different coverings, such as trellis netting upon which plants may climb or shade netting or other coverings known to one skilled in the art. Each bracket has a plurality of different sized sockets enabling different supports and coverings to be used on a bed, either at the same or a different time. For example, small sockets may support a lightweight frame covered with a light trellis for climbing plants, and larger sockets may support a heavier frame supporting a strong trellis or clear plastic protective covering.

In order to obtain maximum versatility from a garden bed having a frame surrounding it, a bracket of the invention has a plurality of sockets of different sizes. In a bracket of the invention, for example, two sockets of different diameters are provided. These sockets may be 1 in. in diameter and ¼ in. in diameter, for supporting heavyweight or lightweight frames for different types of coverings. The bracket is substantially rigid and is advantageously formed of either sheet metal, such as galvanized steel, or of plastic.

The bracket is attached to a frame member by nails, screws, sliding engagement, or other means known to one skilled in the art, and supports for coverings for the bed are inserted in sockets by sliding the end of a support member into a socket of appropriate size. A suitable support framework may be of tent shape to be covered by a similarly tent shaped covering which may be a trellis, shade netting, clear plastic, etc. Lightweight plastic or wire hoop supports may be engaged in narrow sockets for supporting lightweight coverings such as clear plastic or shade netting.

In making a raised garden bed, framing timber, such as 8 ft. or 12 ft. lengths of 2 in. by 8 in. timber, may be used to form the bed. Four such timbers are placed at right angles to each other with ends adjoining, to form a square or rectangular bed, and these framing timbers may be fastened together by use of corner brackets of the invention shown in FIGS. 1 to 4.

Figure 4:
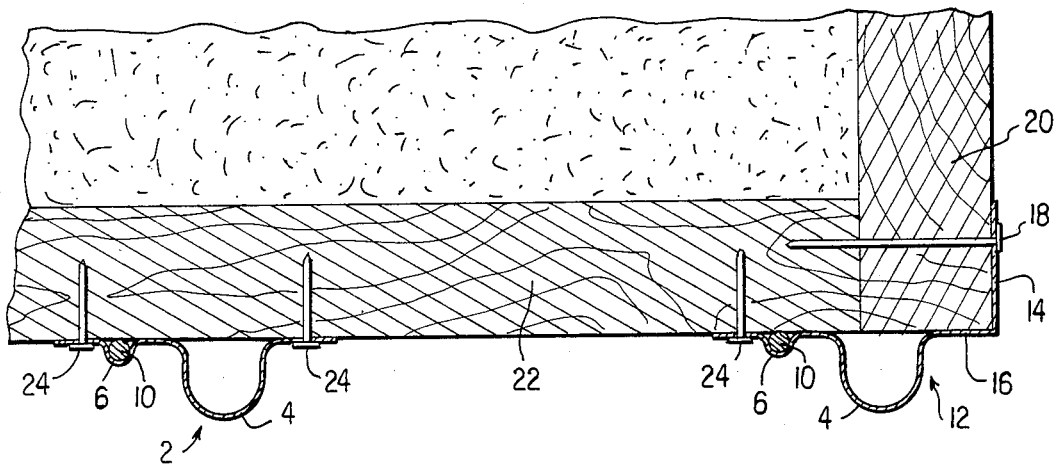
FIG. 4 is a cross-sectional view taken on line 4-4 of FIG. 2.

With reference to FIGS. 1 to 5 in which like numerals represent like parts, a simple bracket 2 of the invention is shown in FIG. 2 in which a wide socket 4 and a narrow socket 6 are formed adjacent to each other. Bracket 2 is nailed to frame member 8 to support a lightweight hoop 10 in narrow socket 6, as shown, or a different support in the wide socket. Another lightweight hoop 10 is supported in narrow socket 6 of corner bracket 12, shown in FIG. 2. Corner bracket 12 is similar to simple bracket 2 but has, in addition, a plate 14, clearly shown in FIG. 3, extending at right angles to bracket face 16 forming an L-shaped bracket. FIG. 4 shows a top view of corner bracket 12 engaged on the corner of a frame for a garden bed showing long securing nails 18 engaged through frame member 20 and into frame member 22, thus securing the frame members at their abutting ends. Shorter nails 24 are sufficient to secure the straight end of a bracket 12 to frame member 22. A simple bracket 2 is shown (in FIG. 4) along the side of frame member 22 for supporting hoops 10 in smaller socket 6 of each bracket. Shorter nails 24 are sufficient for securing simple brackets to frame members.

Figure 5:
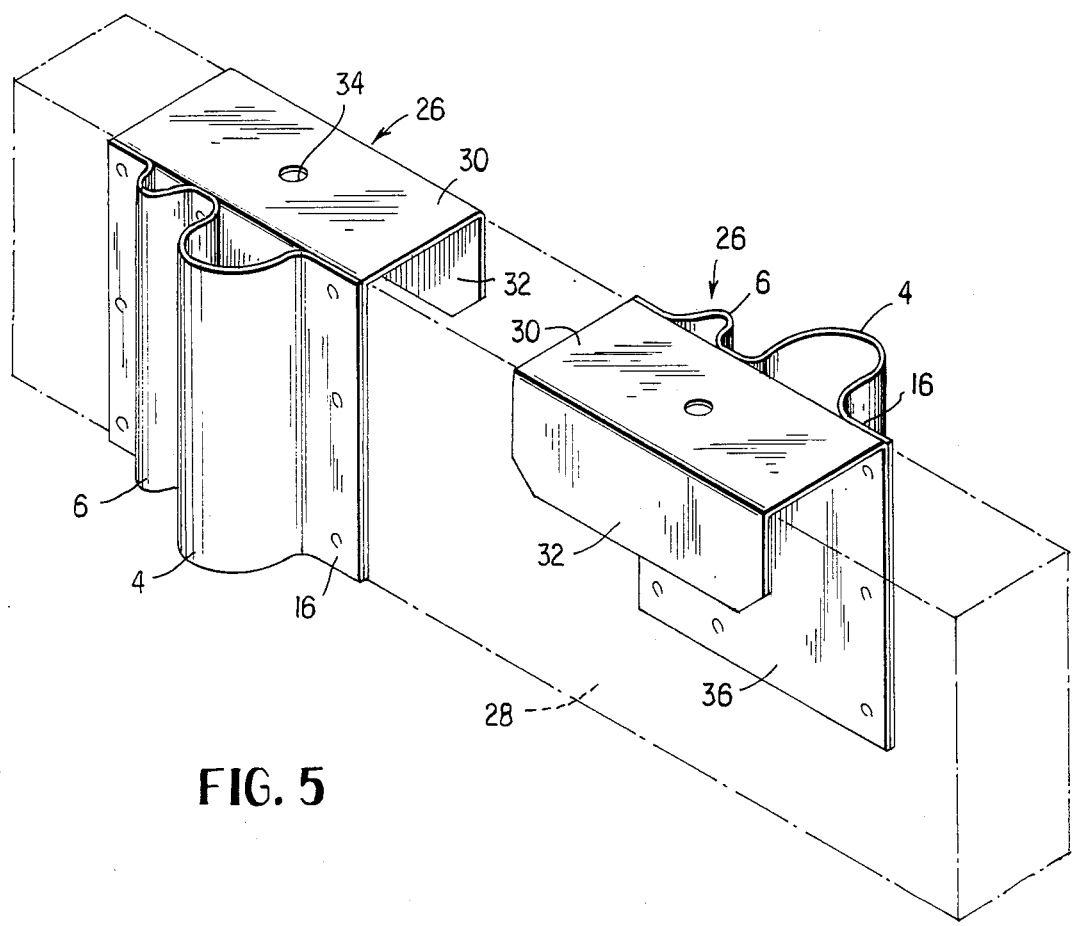
FIG. 5 is a perspective view of J-shaped brackets of the invention engaging both sides of a frame member.

FIG. 5 shows J-brackets 26 suitable for engaging over the edge of frame member 28. J-Brackets 26 may be engaged on either side over the top of a frame member, with the sockets on either the inner side or the outer side of the frame member. J-bracket 26 has plate 36 backing plate surface 16, and plate 30 is attached at right angles to plate 36. Plate 32 extends at right angles to plates 36, 30 so that plates 36, 30, and 32 form a J-shaped bracket for engaging over the top edge of frame member 28 with sockets 4 and 6 positioned for receiving supports. Bracket 26 may be securely engaged over the top of frame 28 without fastening, but for extra security, a nail may be driven through aperture 34 in bracket 26 and into frame member 28. Bracket 26 may be made by fastening a simple bracket 2 to a J-shaped plate, such as is formed by plates 36, 30 and 32. In use, plates 36 and 32 are is placed against vertical faces of member 28, plate 30 abutting the top surface of the frame member.

FIG. 1 shows J-brackets 26 engaged on frame members, with sockets adjacent the inner side of the frame members, while corner brackets 12 are used to secure the corners of the frame as well as being used to engage supports for a trellis. Simple brackets 2 may be used in place of the J-brackets 26, but J-brackets have the advantage of being more easily moved than simple brackets, particularly from placement on the inner side of a frame filled with soil. Different types of supporting members may be engaged in the brackets without moving the brackets, or the brackets may be moved to a different location for reuse. FIG. 1 shows hoops in the J-brackets which may carry netting for supporting climbing plants while a plastic covering is needed over supports 38 as necessary.

Brackets of the invention have many used in extending the outdoor growing season for plants, particularly in colder climates, such as New England. An example of advantageous use of brackets of the invention is in growing European cucumbers. European cucumbers, which are self-pollinating, are not normally able to be grown out-of-doors since pollination from bees or insects causes seed pods to form in the cucumber making it gourd-like and unsaleable. However, European cucumber seeds may be planted in a raised bed similar to the bed shown in FIG. 1. Hoops 10 are placed at intervals along the length of the bed engaged in J-brackets 26 (or in straight brackets) and the hoops are covered with a trellis netting for supporting the cucumbers. Supports 38, engaged in corner brackets 12 and at intervals along the frame, as necessary, are covered by a clear plastic tent to povide a growth environment for the plants free from attack by insects.

The brackets of the invention have many other used. For non-limiting examples, straight or J-brackets may be attached to each end of elevated horizontal cross members secured to posts at a level 2–4 ft. above the level of the bed, to support elevated hoops (and coverings) needed to give tall or climbing plants, such as tomatoes or cucumbers, additional growing space.

Raised beds may be planted intensively as soil in a limited area may easily be enriched. A rectangular raised bed, having a frame fastened with corner brackets of the invention, may be planted early in the spring with flower and/or vegetable seeds and covered with a plastic tunnel while the seeds develop into seedlings. As the weather warms and danger of frost passes, the seelings grow, and the plastic tunnel can be discarded for daytime use but may still be needed at night. Brackets are placed at intervals along the length of the side frame members. Alternatively, an inner frame or trellis for the plants to grow on can be supported, using the brackets, and the whole structure may still be covered with plastic supported on an outer frame at night when temperatures drop. The outer plastic covering is not needed in summertime, and may be replaced with another trellis to allow the plants to climb further, if required.

While the invention has been described with respect to certain embodiments thereof, it will be appreciated that variations and modifications may be made without departing from the spirit and scope of the invention.

What is claimed is:

1. A bracket comprising means adjacent socket means for engagement with a frame for a garden bed, said bracket being of substantially rigid material and comprising a plurality of socket means, at least two of said plurality of socket means forming sockets of different diameters for sliding engagement of an end of one of alternative support means of different diameters, and being adapted for alternative coverings of different materials for extending the growing season for plants planted within the frame of the garden bed.

2. A bracket of claim 1 further comprising angle means for engaging an edge of a frame member.

3. A bracket of claim 2 wherein the angle means engages around a corner of a frame.

4. A bracket of claim 3 wherein said bracket is adapted to secure a corner formed by ends of each of two frame members placed adjacent to each other at right angles.

5. A bracket of claim 2 wherein the angle means are L-shaped.

6. A bracket of claim 2 wherein the angle means are J-shaped.

* * * * *